US007137407B2

(12) United States Patent
Sweeney et al.

(10) Patent No.: US 7,137,407 B2
(45) Date of Patent: Nov. 21, 2006

(54) TRIP MANIFOLD

(75) Inventors: Thomas Sweeney, Verona, PA (US); Richard Peter Natili, Jr, Cecil, PA (US); Matthew E. Wolfe, Pittsburgh, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 0 days.

(21) Appl. No.: 11/062,997

(22) Filed: Feb. 22, 2005

(65) Prior Publication Data

US 2006/0185745 A1 Aug. 24, 2006

(51) Int. Cl.
*F16K 37/00* (2006.01)

(52) U.S. Cl. .......................... 137/552; 415/17; 73/756

(58) Field of Classification Search ................ 137/552, 137/557; 415/17, 118; 73/756; 184/6.1, 184/6.11; 290/52
See application file for complete search history.

(56) References Cited

U.S. PATENT DOCUMENTS

| | | | | |
|---|---|---|---|---|
| 5,303,733 | A * | 4/1994 | Nelson | 137/505.38 |
| 5,561,976 | A | 10/1996 | Chu et al. | |
| 5,610,341 | A * | 3/1997 | Tortora | 73/756 |
| 5,945,591 | A * | 8/1999 | Saarem | 73/1.35 |
| 6,349,735 | B1 * | 2/2002 | Gul | 137/15.09 |
| 6,484,587 | B1 * | 11/2002 | Gul | 73/756 |
| 6,675,829 | B1 * | 1/2004 | Moore et al. | 137/552 |
| 6,729,135 | B1 * | 5/2004 | Norris et al. | 60/646 |
| 6,921,244 | B1 * | 7/2005 | Johnson | 415/26 |

FOREIGN PATENT DOCUMENTS

| | | |
|---|---|---|
| JP | 61129408 | 6/1986 |

OTHER PUBLICATIONS

Protective Devices—"Low Vacuum, Low Bearing Oil Pressure, Thrust Bearing & Solenoid Operated Trips" (Mar. 26, 1968).
Emergency Tripping System—"Using Hydraulic Trip-Reset Pilots Tanden Compound Turbine with Trip Anticipator" (Nov. 1968).
Search Report under Section 17(5) issued in GB0603453.2 application by United Kingdom Patent Office on Jun. 14, 2006.

* cited by examiner

*Primary Examiner*—John Fox
(74) *Attorney, Agent, or Firm*—Marshall, Gerstein & Borun LLP

(57) ABSTRACT

A trip manifold assembly is disclosed which includes a manifold body connected to a header shaft. The header shaft passes through a plurality of rotary valves. Each rotary valve is connected to a pressure transmitter. The header shaft comprises two passages including a transmitter input passage and a drain passage. The rotary valves each comprise a through passage. A manifold body provides fluid communication between an input source and the transmitter input passage of the header shaft. The manifold also provides communication between the drain passage of the header shaft and a drain vent. The rotary valves are each independently rotatable between two positions including a transmit position where the through passage of each valve provides communication between the transmitter input passage of the header shaft and their respective pressure transmitters. Each rotary valve is also independent rotatable to a drain position where the through passage of each valve is in communication with the drain passage of the header shaft. Multiple header shafts may be provided in a single manifold assembly and each header shaft can handle more than one input that needs to be monitored.

20 Claims, 3 Drawing Sheets

TRIP MANIFOLD

TECHNICAL FIELD

An emergency trip manifold for a turbine or other piece of industrial equipment is shown and described. More specifically, the trip manifold provides a compact design with multiple pressure readings of multiple sources. Pressure transmitters may be removed or serviced while the system is still operating. The disclosed manifold replaces the cumbersome emergency tripping systems currently used with industrial turbines and other devices where it is imperative to keep certain pressure readings, such as bearing oil pressures, thrust bearing oil pressures, condenser vacuum pressures and/or exhaust pressures within a certain predetermined range.

BACKGROUND OF THE RELATED ART

Emergency tripping systems have long been utilized to shut off industrial turbines in the event certain operating conditions occur. Such tripping systems are commonly designed around certain pressure readings. Those pressure readings, and the maintenance of such pressures within a prescribed range, include a pressure or vacuum reading in the condenser vacuum which is indicative of exhaust pressure, maintenance of oil bearing pressure, the prevention of an increase in the thrust bearing oil pressure and a monitoring of the autostop oil pressure. Often, the autostop oil pressure line may be in communication with a solenoid valve.

Of course, other components may form part of an emergency tripping system such as anticipator trip valves which may be tripped or activated by excessive speed of the turbine. A turbine emergency trip valve may be incorporated along with stop valve bypass trips, auxiliary pilot valve trips, lock out sleeve trips and other emergency trip functions, depending upon the manufacturer. Those skilled in the art and familiar with the turbine designs of Westinghouse and General Electric will be familiar with various trip functions associated with these turbines.

One problem associated with emergency tripping systems for industrial turbines, engines and other similar apparatuses is the cumbersome design of such systems. Specifically, piping must be provided for each pressure sensing function which is then connected to a separate transmitter. Often, it is desirable to use redundant transmitters to monitor each trip function. Specifically, transmitters are prone to failure and require frequent maintenance. Manufacturers therefore often utilize two or three transmitters to monitor one trip function with the criteria that at least two of the transmitters must register an alarm status before a shut down procedure is begun.

With the common use of multiple redundant transmitters or multiple redundant distributed control system (DCS) inputs for each trip function, the piping, wiring and mounting for the various trip functions becomes cumbersome to install and difficult to maintain. Specifically, typical systems include multiple manifolds with custom mounts that are interconnected with extensive quantities of tubing and pipe. Still further, due to the cumbersome design of these systems, there is no easy way to gain access to the transmitters or valves for service and maintenance. Thus, an improved emergency tripping system for turbines and other industrial apparatuses is needed that is less cumbersome, reliable and easy to install and maintain.

SUMMARY OF THE DISCLOSURE

In accordance with the aforenoted needs, an improved trip manifold is disclosed which comprises a manifold body connected to a stationary header shaft. The header shaft passes through a plurality of rotary valves. Each of the rotary valves is connected to a pressure transmitter. The header shaft includes two passages including a transmitter input passage and a drain passage. The rotary valves each comprise a through passage directed towards the pressure transmitter. The manifold body provides fluid communication between an input source and the transmitter input passage of the header shaft. The manifold also provides communication between the drain passage of the header shaft and a drain vent or pressure dump. The rotary valves are each independently rotatable between two positions including a transmit position where the through passage of each valve provides communication between the transmitter input passage of the header shaft and the respective pressure transmitters and a drain position where the through passage of each valve is in communication with the drain passage of the header shaft.

In the transmit position, fluid communication is provided by the manifold and header shaft between the input source and the pressure transmitter. In the drain position, the transmitter is isolated and pressure is released from the valve to the drain vent. Thus, in the drain position, the transmitter may be safely removed and examined for service, maintenance or possible replacing. By providing multiple valves and transmitters on a header shaft, multiple redundancy pressure transmitters may be provided for a single input source. Because each valve and transmitter can be rotated to the drain position without interfering with the function of the other valves and transmitters, a single valve and transmitter can be moved to the drain position to release pressure within the valve and the transmitter can be safely removed, serviced and maintained or replaced without interfering with the operation of the other valves and transmitters. In this manner, a transmitter may be replaced without interfering with the operation of the remaining components of the manifold and therefore the turbine, engine or other apparatus being monitored may continue to run or stay on-line while a transmitter is replaced or serviced. In a preferred embodiment, three valves and three transmitters are disposed on the header shaft for each transmitter input passage and drain passage.

In one embodiment, the header shaft includes two sets of transmitter input passages and drain passages. In this embodiment, each set of transmitter input passages and drain passages extend along a different section of the header shaft. Specifically, one set of a transmitter input passage and drain passage extend axially along the header shaft from one end of the header shaft and the other set of the transmitter input passage and drain passage extend axially along the header shaft from the other end of the header shaft. In this way, the header shaft is divided into two parts, with one set of rotary valves and transmitters disposed on one part or one half of the header shaft and another set of rotary valves and transmitters disposed on the other part or other half of the header shaft. Thus, in this embodiment, one header shaft provides input communication to two different sets of valves and transmitters and also provides a drain function for each set of valves and transmitters.

In another preferred embodiment, the manifold includes a second header shaft disposed parallel to and either above or below the first header shaft. Similar or identical to the design of the first header shaft, the second header shaft also passes through a plurality of rotary valves and, most preferably, two sets of rotary valves. Therefore, the second header shaft preferably includes two sets of passages with each set including a transmitter input passage and a drain passage. In this preferred embodiment, four inputs may be monitored by the single manifold with a double or triple redundancy.

However, it may be preferable to connect the drain passages to provide a single drain passage in each header shaft.

Another option is to include a separate drain passage and separate drain for certain inputs where it is advantageous to include a separate, isolated drain. One such example is the vacuum drain of a turbine.

In another refinement, the manifold body is connected to a pair of parallel and spaced apart support blocks. The support blocks are, in turn, connected to and support the header shaft(s). The support blocks also include passages or routing to provide communication between the various inputs and the transmitted input passages of the header shafts and between the drain and the drain passages of the header shafts. The support blocks also provide a convenient place to mount gauges or connections for gauges. Of course, gauges may also be mounted to the manifold body.

Therefore, in a preferred embodiment, the manifold body is connected to four inputs that need to be monitored and is connected to two header shafts by two support blocks. Communication is provided between the header shafts and the manifold body by the support blocks. Further, in the preferred embodiment, each header shaft provides communication to two sets of three rotary valves and pressure transmitters. Therefore, the preferred manifold design provides triple redundant monitoring of four inputs and therefore it provides communication to four sets of three rotary valves and transmitters for a total of twelve valves and twelve transmitters.

However, it will be noted that the disclosed manifold design is applicable to systems with more than four inputs or less than four inputs, such as a single input. The disclosed manifold design is also applicable to systems only requiring double redundancy or no redundancy. Further, an improved method for replacing or removing a transmitter from a system while the system is on-line is also disclosed which includes moving one of the valves to the drain position as described above.

The disclosed design is particularly adaptable to currently used Westinghouse steam turbines. However, the disclosed manifold assemblies are adaptable to other uses and therefore this disclosure is not limited to trip manifolds for steam turbines, but only to trip manifolds for industrial devices requiring emergency tripping systems.

BRIEF DESCRIPTION OF THE DRAWINGS

The disclosed trip manifolds and methods of use and maintenance thereof will be described more or less diagrammatically in the accompanying drawings, wherein.

It should be understood that the drawings are not necessarily to scale and that the disclosed embodiment is illustrated in certain instances with symbols, phantom lines, diagrammatic representations and partial fragmentary views. In certain instances, details, such as connections between support blocks and the manifold body or vice versa and the various fluid pathways through the manifold body and support blocks, which are not necessary for an understanding of the disclosed embodiment or which render other details difficult to perceive, have been omitted. It should be understood, of course, that this disclosure is not limited to the particular embodiment illustrated herein.

DETAILED DESCRIPTION OF THE PRESENTLY PREFERRED EMBODIMENTS

FIGS. 1–4 illustrate a trip manifold assembly 10 which is particularly useful for Westinghouse steam turbines but it will be apparent to those skilled in the art that the disclosed manifold assemblies 10 are also adaptable to other turbines, such as those manufactured by General Electric, and other industrial devices that require monitoring such as generators, engines and the like.

Figure 1:
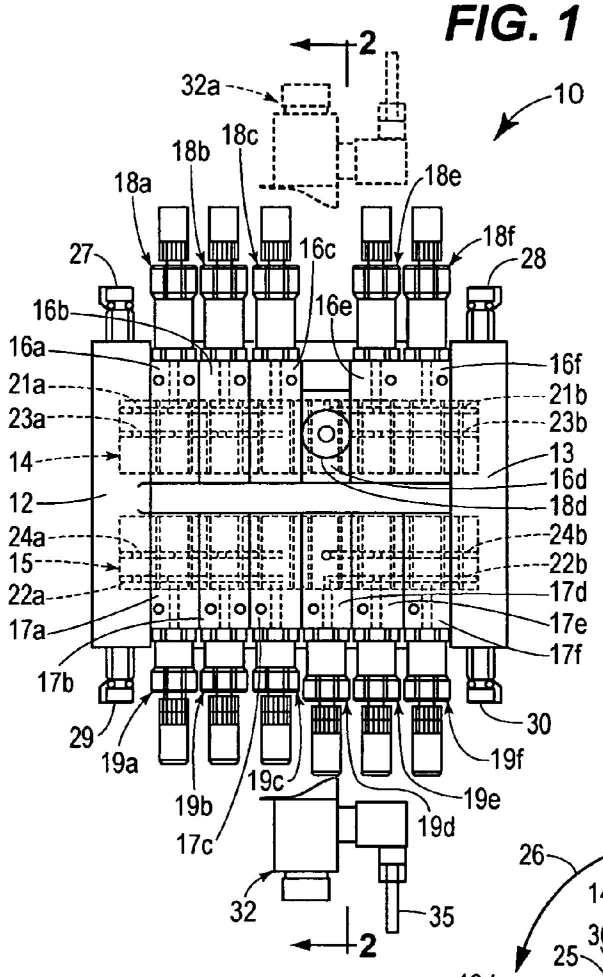
FIG. 1 is a front plan view of a trip manifold assembly made in accordance with this disclosure.
Figure 2:
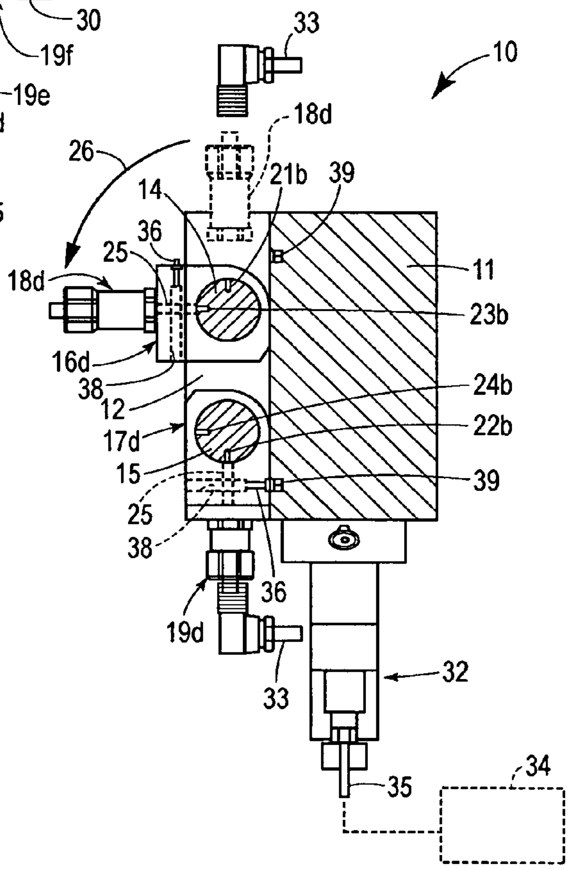
FIG. 2 is a side plan section view of the trip manifold shown in FIG. 1 particularly illustrating movement of a rotary valve and transmitter from a transmit position to a drain position.

Referring to FIGS. 1 and 2, the manifold assembly 10 includes a manifold body 11 which is connected to two spaced apart support blocks 12, 13. The support blocks 12, 13 may be an integral part of the manifold body 11 or attached separately thereto. The support blocks 12, 13 are connected to and support the header shafts 14, 15. The header shafts 14, 15 are fixedly connected to the support blocks 12, 13 and do not rotate. In the embodiments shown in FIGS. 1–4, two header shafts 14, 15 are provided. It will be also understood that the advantages of the design could be accomplished with a single header shaft 14 or 15.

In the embodiment shown in FIGS. 1–4, the header shaft 14 passes through a plurality of rotary valves shown generally at 16 and individually at 16*a*–16*f* and the header shaft 15 passes through a plurality of rotary valves shown generally at 17 and individually at 17*a*–17*f*. Each rotary valve 16*a*–16*f* is connected to pressure transmitters 18*a*–18*f* and, similarly, the rotary valves 17*a*–17*f* are connected to pressure transmitters 19*a*–9*f*. Thus, in the preferred embodiment illustrated in FIGS. 1–4, the trip manifold assembly 10 includes two header shafts 14, 15 that each pass through six rotary valves 16, 17, respectively. Further, in this preferred embodiment, the valves 16, 17 and transmitters 18, 19 can each be divided into two groups for a total of four groups: 16*a*–16*c*, 18*a*–18*c*; 16*d*–16*f*, 18*d*–18*f*; 17*a*–17*c*, 19*a*–19*c*; and 17*d*–17*f*, 19*d*–19*f*. Thus, this manifold assembly 10 provides a triple redundancy trip system for four inputs.

To handle the two sets of rotary valves 16, 17 and transmitters 18, 19 associated with each header shaft 14, 15, each header shaft 14, 15 includes two sets of passages including the transmitter input passages shown at 21*a*, 21*b*, 22*a*, 22*b* and the drain passages shown at 23*a*, 23*b*, 24*a*, 24*b*. In an embodiment, the drain passages 23*a*, 23*b* may be connected together and the drain passages 24*a*, 24*b* may be connected together as shown in phantom in FIG. 5 below. Thus, the header shaft 14 includes two sets of passages including the transmitter input passage 21*a* and the drain passage 23*a* as well as the transmitter input passage 21*b* and drain passage 23*b*. Similarly, the header shaft 15 includes two sets of passages including the transmitter input passage 22*a* and drain passage 24*a* as well as the transmitter input passage 22*b* and drain passage 24*b*. As shown in FIG. 1, each set of passages (21*a*/23*a*; 21*b*/23*b*; 22*a*/24*a*; and 22*b*/

24*b*) are in communication with a set of three rotary valves (16*a*–16*c*; 16*d*–16*f*; 17*a*–17*c*; and 17*d*–17*f*).

Referring to FIG. 2, the lower rotary valve 17*d* is in the transmit position whereby the transmitter input passage 22*b* of the header shaft 15 is in communication with the through passage 25 of the rotary valve 17. In the position shown in FIG. 2, the rotary valve 17*d* is in the transmit position where pressure is communicated through the transmitter input passage 22*b*, through the through passage 25 to the pressure transmitter 19*d*. In FIG. 1, rotary valves 16*a*–16*c*, 16*e*–16*f*, and 17*a*–17*f* are in the “transmit” position.

In contrast, in FIG. 2, the upper rotary valve 16*d* is in the “drain” position. In this position, the rotary valve 16*d* and pressure transmitter 18*d* have been rotated in the direction of the arrow 26 so that the through passage 25 of the rotary valve 16*d* is in communication with the drain passage 23*b* of the header shaft 14. In this position, any pressure within the rotary valve 16*d* has been bled through the drain passage 23*b* so that the transmitter 18*d* can be safely removed for inspection, service or replacement. Further, it will be noted that in this “drain” position, the transmit input passage 21*b* of the header shaft 14 is isolated with respect to the valve 16*d* which has been temporarily taken out of service. Thus, one valve 16*d* and its corresponding transmitter 18*d* can be removed from service without affecting the operation of the other valves 16, 17 and transmitters 18, 19 shown in FIG. 1.

Figure 3:
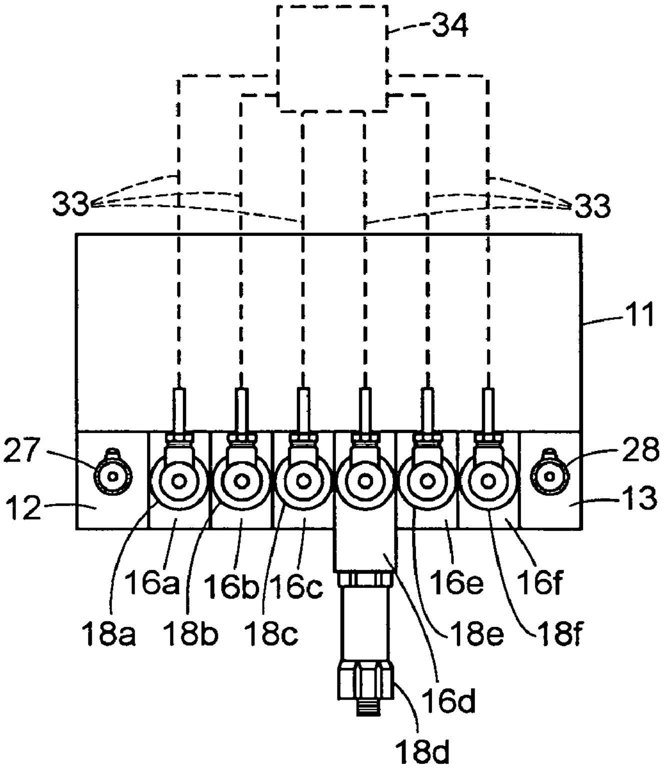
FIG. 3 is a top plan view of the manifold assembly shown in FIGS. 1 and 2.
Figure 5:
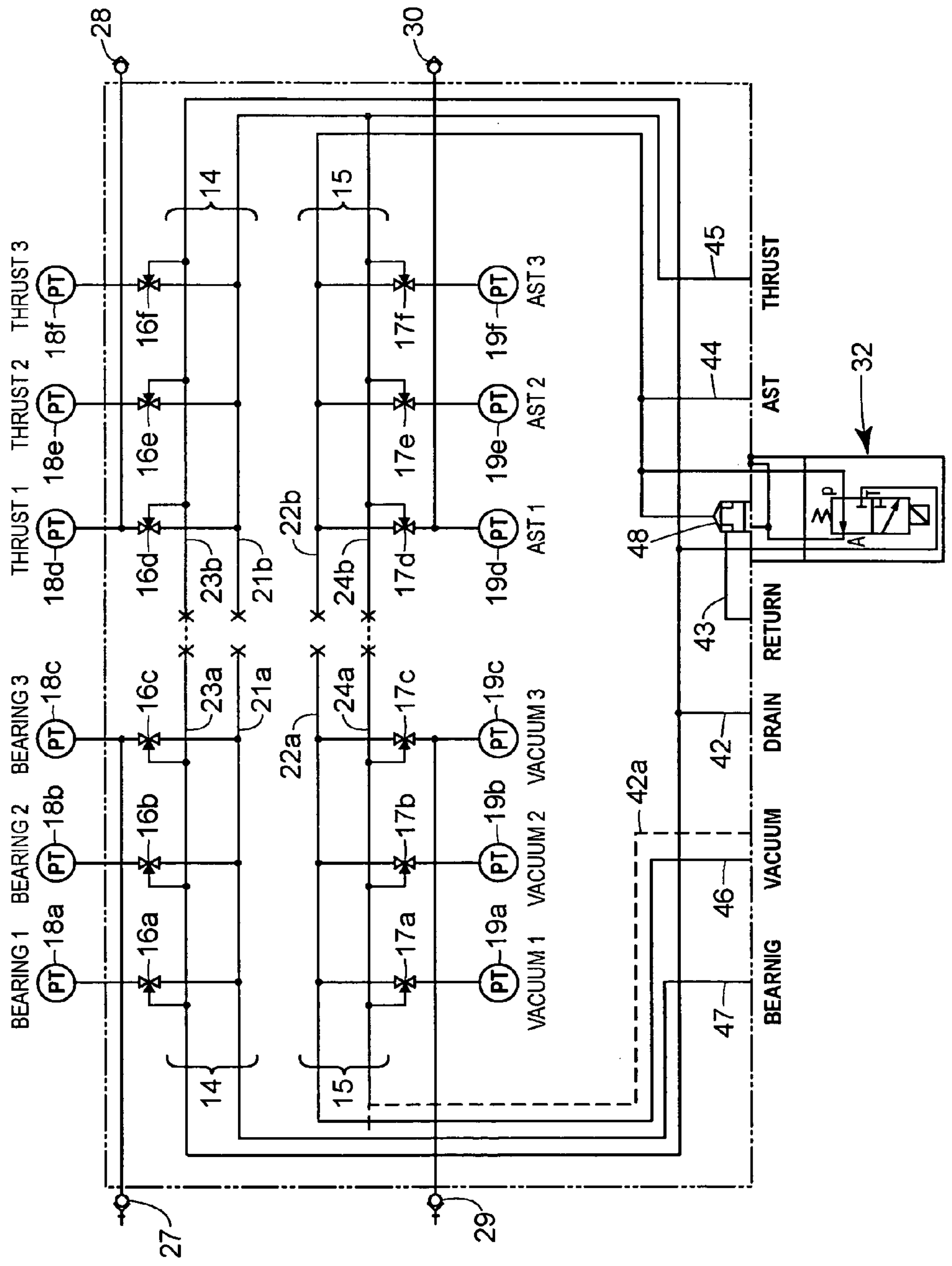
FIG. 5 is a distributed control system (DSC) circuit diagram for the manifold assembly shown in FIGS. 1–4.

Also shown in FIGS. 1 and 3 are four gauge connections 27–30 which enable the four inputs described below to be monitored visually with gauges. Also shown in FIGS. 1, 2 and 5 is a solenoid valve 32. The solenoid 32 may be disposed on the top or on the bottom of the body 11 as shown by the solenoid 32*a* shown in phantom in FIG. 1. Also, two redundant solenoids 32, 32*a* may be employed. Also shown in FIGS. 2 and 3 is a lead 33 connecting each pressure transmitter 18, 19 to a controller 34 (FIG. 3). Similarly, a lead 35 connects the solenoid valve 32 to the controller 34 as well. Referring back to FIG. 2, the manifold body 11 includes a plurality of shaped recesses 35 for receiving lock elements 36 that are disposed in the rotary valves 16, 17. Additional passages 38 are provided to provide access to the lock elements 36. Specifically, the passages 38 provide access to the lock elements 36 by a screwdriver or other similar device.

Figure 4:
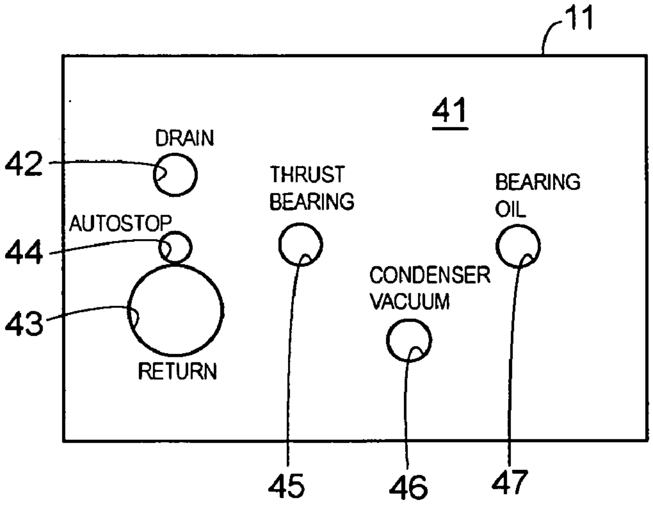
FIG. 4 is a rear plan view of the manifold body of the manifold assembly shown in FIGS. 1–3.

Turning to FIG. 4, the rear surface 41 of the manifold body 11 is shown. A common drain opening 42 is shown which is in communication with the drain passages 23*a*, 23*b*, 24*a*, 24*b* of the header shafts 14, 15 when one of the rotary valves 16, 17 is in the drain position as shown by the valve 16*d* in FIGS. 1–3. The drain opening 42 is provided to release pressure from any one of the valves 16, 17 prior to removal of the transmitter 18, 19 from the valve 16, 17. The return opening 43 is in communication with the solenoid valve 32 and will be discussed below in connection with FIG. 5. Therefore, the manifold body 11 provides four inputs and the remaining openings include an autostop input 44, a thrust bearing input 45, a condenser vacuum input 46 and a bearing oil pressure input 47. The communicating passages between the openings or inputs 42–47 shown in FIG. 4 and the transmitter input passages 21*a*, 21*b*, 22*a*, 22*b* through the manifold body 11 are not shown for the sake of simplicity. However, it will be noted that communication is provided by the manifold body 11 in combination with the support blocks 12, 13 as discussed below in connection with FIG. 5.

Specifically, referring first to the bearing oil input 47 (FIG. 4), FIG. 5 shows that the bearing oil input 47 is communicatively linked to the valves 16*a*–16*c*. Further, the drain 42 is also linked to these valves 16*a*–16*c*. Thus, the manifold body 11 and support block 12 provides a communicating passage between the bearing oil pressure input 47 and the transmitter input passage 21*a*. Further, the manifold body 11 and support block 12 provide communication between the drain 42 and the drain passage 23*a* of the header shaft 14.

Still referring to header shaft 14 and FIGS. 4–5, the thrust oil bearing pressure input 45 is linked to the valves 16*d*, 16*e* and 16*f*. Thus, the input 45 shown in FIG. 4 is communicatively linked to the valves 16*d*–16*f* by the manifold 11, support block 13 and the transmit input passage 21*b* of the header shaft 14. Similarly, the drain 42 is also linked to the drain passage 23*b* of the header shaft 14 by the manifold body 11 and support block 13.

Turning now to the header shaft 15, as shown in FIG. 5, the condenser vacuum input 46 is linked by the manifold 11, support block 12 and transmitter input passage 22*a* of the header shaft 15 and to the rotary valves 17*a*, 17*b* and 17*c*. Similarly, the drain 42 may link to the valves 17*a*–17*c* by the manifold body 11, support block 12 and drain passage 24*a* of the header shaft 15. As an alternative, in order to avoid oil leakages into the condenser from the other drain lines 23*a*, 23*b* and 34*b*, it may be advisable to isolate the vacuum drain passage 24*a* from the other drain passages 23*a*, 23*b* and 24*b* (see also FIG. 1) using the separate drain 42*a* as shown in phantom in FIG. 5. The read will also note that the alternative options of (1) connecting the vacuum drain passage 24*a* through the common drain 42 and (2) connecting the pairs of drain passages 23*a*, 23*b* and 24*a*, 24*b* together is also shown in FIG. 5 using phantom lines.

Referring now to the autostop input shown at 44 in FIGS. 4 and 5, this input is linked to the valves 17*d*–17*f* by the manifold body 11, support block 13 and transmitter input passage 22*b* of the header shaft 15. Similarly, the valves 17*d*–17*f* are also linked to the drain 42 by the drain passage 24*b* of the header shaft 15, the support block 13 and the manifold body 11. The autostop input 44 is also linked to the solenoid valve 32 and return 43 as shown in FIG. 5 because, to shut down the system, pressure in the autostop line 44 must be depleted before the system can be shut down. Specifically, the solenoid 32 includes a valve 48 that remains biased in a closed position thereby isolating the return 43 from the autostop 44. If the autostop oil pressure falls below a predetermined level, the valve 48 is opened thereby providing communication between a return 43 and the autostop oil line 44 thereby enabling the system to be shut down. Also, the system may be shut down by activating the solenoid 32 which provides communication between the solenoid 32 and the drain 42 thereby opening the valve 48 and establishing communication between the autostop 44 and return 43.

Therefore, a simple, compact assembly 10 is provided which enables double triple redundancy monitoring of one to four or more different inputs. In this case, triple redundancy may be provided for thrust bearing oil pressure, bearing oil pressure, condenser vacuum pressure and autostop oil pressure. Of course, the design can be modified to provide triple redundancy monitoring for four different inputs and the design can be further modified by providing no redundancy or double redundancy monitoring of less than or more than four inputs. The manifold assembly 10, while clearly applicable to steam turbines, is also applicable to other industrial devices that require monitoring for operation safety.

While only a single preferred embodiment has been described in the figures, alternative embodiments and various modifications will be apparent from the above descriptions of those skilled in the art. These and other alternatives are considered equivalents and within the spirit and scope of this disclosure.

What is claimed is:

1. A trip manifold comprising:
a manifold body connected to a header shaft,
the header shaft passing through a plurality of rotary valves,
each of rotary valves being connected to a pressure transmitter,
the header shaft comprising two passages including a transmitter input passage and a drain passage, the rotary valves each comprising a through passage,
the manifold body providing fluid communication between an input source and the transmitter input passage of header shaft, the manifold also providing communication between the drain passage of the header shaft and a drain vent,
the rotary valves each being independently rotatable between two positions including
a transmit position where the through passage of each valve provides communication between the transmitter input passage of the header shaft and their respective pressure transmitters and
a drain position where the through passage of each valve is in communication with the drain passage of the header shaft.

2. The trip manifold of claim 1 wherein the rotary valves includes three valves each of which is connected to its own pressure transmitter.

3. The trip manifold of claim 2 wherein each pressure transmitter is connected to a controller and wherein two of the three transmitters must indicate an alarm situation before the controller starts an emergency shut down routine.

4. The trip manifold of claim 1 wherein the manifold body is connected to a shaft support block, and the shaft support block being connected to and supporting the header shaft, the shaft support block providing communication between the transmitter input passage and the drain passage of the header shaft and the manifold body.

5. The trip manifold of claim 1 wherein the manifold body is connected to a pair of spaced apart shaft support blocks with each shaft support block being connected to and supporting the header shaft, one of the shaft support blocks providing communication between the transmitter input passage and the drain passage of the header shaft and the manifold body.

6. The trip manifold of claim 1 wherein each of the set of rotary valves comprises a lock passage for accommodating a lock element and the manifold body comprises separate openings for receiving the locking elements to lock the rotary valves in the transmit position.

7. A trip manifold comprising:
a manifold body connected to a first header shaft,
the first header shaft passing through a first set of a plurality of rotary valves and a second set of a plurality of rotary valves,
each of the first and second sets of rotary valves being connected to their own individual pressure transmitters,
the first header shaft comprising a first set of two passages including a first transmitter input passage and a first drain passage and a second set of passages including a second transmitter input passage and a second drain passage, the first set of rotary valves each comprising a first through passage, the second set of rotary valves each comprising a second through passage,
the manifold body providing fluid communication between a first input source and the first transmitter input passage of first header shaft and between a second input source and the second transmitter input passage of the first header shaft, the manifold also providing communication between the first drain passage and a drain vent and between the second drain passage and the drain vent,
the first set of rotary valves each being independently rotatable between two positions including
a transmit position where the first through passage of each valve of the first set of valves provides communication between the first transmitter input passage of the first header shaft and their respective pressure transmitters and
a drain position where the first through passage of each valve of the first set of valves is in communication with the first drain passage of the first header shaft,
the second set of rotary valves each being independently rotatable between two positions including
a transmit position where the second through passage of each valve of the second set of valves provides communication between the second transmitter input passage of the first header shaft and their respective pressure transducers and
a drain position where the second through passage of each valve of the second set of valves is in communication with the second drain passage of the first header shaft.

8. The trip manifold of claim 7 wherein the first set of rotary valves includes three valves each of which is connected to its own pressure transmitter and wherein the second set of rotary valves includes three valves each of which is connected to its own pressure transmitter.

9. The trip manifold of claim 8 wherein each pressure transmitter is connected to a controller and wherein two of the three transmitters of either set of valves must indicate an alarm situation before the controller starts an emergency shut down routine.

10. The trip manifold of claim 7 wherein the manifold body is connected to a pair of spaced apart shaft support blocks, and the first header shaft being connected to and suspended between the support blocks, one of the support blocks providing communication between the first transmitter input passage and the first drain passage of the first header shaft and the first input source and drain vent respectively of the manifold body and the other the first pair of support blocks providing communication between the second transmitter input passage and the second drain passage of the first header shaft and second input source and drain vent respectively of the manifold body.

11. The trip manifold of claim 7 wherein each of the rotary valves comprises a lock passage for accommodating a lock element and the manifold body comprises separate openings for receiving the locking elements to lock the rotary valves in the transmit position.

12. The trip manifold of claim 10 further comprising
a second header shaft connected to an extending between the support blocks but spaced apart from the first header shaft,
the second header shaft passing through a third set of a plurality of rotary valves and a fourth set of a plurality of rotary valves,
each of the third and fourth sets of rotary valves being connected to their own pressure transmitters,
the second header shaft comprising a third set of two passages including a third transmitter input passage and a third drain passage and a fourth set of passages including a fourth transmitter input passage and a fourth drain passage, the third set of rotary valves each comprising a third through passage, the fourth set of rotary valves each comprising a fourth through passage, the manifold body providing fluid communication between a third input source and the third transmitter input passage of second header shaft and between a fourth input source and the fourth transmitter input passage of the second header shaft, the manifold also providing communication between the third drain passage of the second header shaft and a drain vent and between the fourth drain passage of the second header shaft and the drain vent, the third set of rotary valves each being independently rotatable between two positions including a transmit position where the third through passage of each valve of the third set of valves provides communication between the third transmitter input passage of the second header shaft and their respective pressure transmitters and a drain position where the first through passage of each valve of the third set of valves is in communication with the third drain passage of the second header shaft, the fourth set of rotary valves each being independently rotatable between two positions including a transmit position where the fourth through passage of each valve of the fourth set of valves provides communication between the fourth transmitter input passage of the second header shaft and their respective pressure transmitters and a drain position where the fourth through passage of each valve of the fourth set of valves is in communication with the fourth drain passage of the second header shaft.

13. The trip manifold of claim 12 wherein the first through fourth input sources are condenser vacuum trip line, low bearing oil pressure trip line, high thrust bearing oil pressure trip line and autostop oil pressure trip line.

14. The trip manifold of claim 13 wherein the autostop oil pressure trip line is further linked to a solenoid valve.

15. A method of replacing a pressure transmitter of a trip device of a turbine assembly while the turbine is running, the method comprising:

providing a trip manifold comprising a manifold body connected to a header shaft, the header shaft passing through a plurality of rotary valves, each of rotary valves being connected to its own pressure transmitter, the header shaft comprising two passages including a transmitter input passage and a drain passage, the rotary valves each comprising a through passage, the manifold body providing fluid communication between an input source and the transmitter input passage of header shaft, the manifold also providing communication between the drain passage of the header shaft and a drain vent, the rotary valves each being independently rotatable between two positions including a transmit position where the through passage of each valve provides communication between the transmitter input passage of the header shaft and their respective pressure transducers and a drain position where the through passage of each valve is in communication with the drain passage of the header shaft;

with all valves in the transmit position and with the turbine running, determining which transmitter needs replacing;

pivoting the valve connected to the transmitter that needs replacing to the drain position;

removing and replacing said transmitter;

pivoting said valve back to the transmit position.

16. The method of claim 15 wherein there are three valves in communication with the input source and a transmitter is determined to be in need of replacing when it transmits a signal that is disparate from signals being sent by the other two transmitters.

17. A turbine having a single trip manifold, the single trip manifold comprising:

a manifold body connected to a first header shaft and second header shaft, the first header shaft passing through a first set of a plurality of rotary valves and a second set of a plurality of rotary valves, the second header shaft passing through a third set of a plurality of rotary valves and a fourth set of a plurality of rotary valves, each of the first, second, third and fourth sets of rotary valves being connected to their own individual pressure transmitters, the first header shaft comprising a first set of two passages including a first transmitter input passage and a first drain passage and a second set of passages including a second transmitter input passage and a second drain passage, the first set of rotary valves each comprising a first through passage, the second set of rotary valves each comprising a second through passage, the second header shaft comprising a third set of two passages including a third transmitter input passage and a third drain passage and a fourth set of passages including a fourth transmitter input passage and a fourth drain passage, the third set of rotary valves each comprising a third through passage, the fourth set of rotary valves each comprising a fourth through passage, the manifold body providing fluid communication between a first input source and the first transmitter input passage of first header shaft and between a second input source and the second transmitter input passage of the first header shaft, the manifold also providing communication between the first drain passage and a drain vent and between the second drain passage and the drain vent, the manifold body providing fluid communication between a third input source and the third transmitter input passage of second header shaft and between a fourth input source and the fourth transmitter input passage of the second header shaft, the manifold also providing communication between the third drain passage of the second header shaft and a drain vent and between the fourth drain passage of the second header shaft and the drain vent, the each set of rotary valves each being independently rotatable between two positions including a transmit position where the through passage of each valve provides communication between the transmitter input passage of its respective header shaft and their respective pressure transmitters and a drain position where the through passage of each valve is in communication with the drain passage of its respective header shaft, the second set of rotary valves each being independently rotatable between two positions including a transmit position where the second through passage of each valve of the second set of valves provides communication between the second transmitter input passage of the first header shaft and their respective pressure transmitters and a drain position where the second through passage of each valve of the second set of valves is in communication with the second drain passage of the first header shaft.

18. The turbine of claim 17 wherein the manifold body is connected to a pair of spaced apart shaft support blocks, and the first second header shafts being connected to and suspended between the support blocks in a parallel but spaced apart fashion.

19. The turbine of claim 17 wherein the first through fourth input sources are condenser vacuum trip line, low bearing oil pressure trip line, high thrust bearing oil pressure trip line and autostop oil pressure trip line.

20. The turbine of claim 17 wherein any one of the valves may be moved to the drain position and the transmitter removed while the turbine is running.

* * * * *

UNITED STATES PATENT AND TRADEMARK OFFICE

CERTIFICATE OF CORRECTION

PATENT NO. : 7,137,407 B2 Page 1 of 1
APPLICATION NO. : 11/062997
DATED : November 21, 2006
INVENTOR(S) : Thomas Sweeney et al.

It is certified that error appears in the above-identified patent and that said Letters Patent is hereby corrected as shown below:

In the Drawings:

At Sheet 3, Fig. 5, bottom line of text, “BEARNIG” should be -- BEARING --.

In the Claims:

At Column 8, line 58, “to an extending” should be -- to and extending --.

Signed and Sealed this

Fourteenth Day of August, 2007

JON W. DUDAS
*Director of the United States Patent and Trademark Office*

UNITED STATES PATENT AND TRADEMARK OFFICE

CERTIFICATE OF CORRECTION

PATENT NO. : 7,137,407 B2
APPLICATION NO. : 11/062997
DATED : November 21, 2006
INVENTOR(S) : Thomas Sweeney et al.

It is certified that error appears in the above-identified patent and that said Letters Patent is hereby corrected as shown below:

**

In the Claims:

At Col. 8, line 25, "transducers" should be -- transmitters --.

At Col. 9, line 65, "transducers" should be -- transmitters --.

Signed and Sealed this

Twenty-sixth Day of January, 2010

David J. Kappos

*Director of the United States Patent and Trademark Office*